United States Patent

[11] 3,556,237

| [72] | Inventor | Eric Allison |
| | | Anlaby, England |
| [21] | Appl. No. | 722,968 |
| [22] | Filed | Apr. 22, 1968 |
| [45] | Patented | Jan. 19, 1971 |
| [73] | Assignee | National Research Development Corporation |
| | | London, England |
| [32] | Priority | Apr. 20, 1967, Aug. 2, 1967 |
| [33] | | Great Britain |
| [31] | | 18244/67 and 35457/67 |

[54] ELECTRICAL WEIGHING DEVICE FOR WEIGHING LOADS SUBJECT TO MOVEMENT
12 Claims, 8 Drawing Figs.

[52] U.S. Cl. .................................................. 177/200,
177/211
[51] Int. Cl. ...................................................... G01g 3/14,
G01g 19/00
[50] Field of Search ........................................... 177/147,
200, 210, 211; 73/88.5

[56] References Cited
UNITED STATES PATENTS
| 2,767,974 | 10/1956 | Ballard et al. ................. | 177/211X |
| 2,767,975 | 10/1956 | Horst et al. .................... | 177/200 |
| 3,201,983 | 8/1965 | Hebert et al. ................. | 177/211X |

*Primary Examiner*—Robert S. Ward, Jr.
*Attorney*—Kurt Kelman

ABSTRACT: The invention concerns apparatus for providing an electrical signal significant of the true weight of a load experiencing vertical accelerations or tilting while being weighed comprising a carrier on which the load is placed during weighing wherein the improvement comprises a load cell through which the apparent weight of the load is transmitted to a support, an accelerometer mounted to be subject to the same vertical accelerations or tilting as the load, and electrical circuitry in which the accelerometer and the load cell are connected and from which said signal is obtained, the accelerometer being connected to suppress the occurrence in the electrical signal of a component produced by vertical acceleration or tilting of the load being weighed.

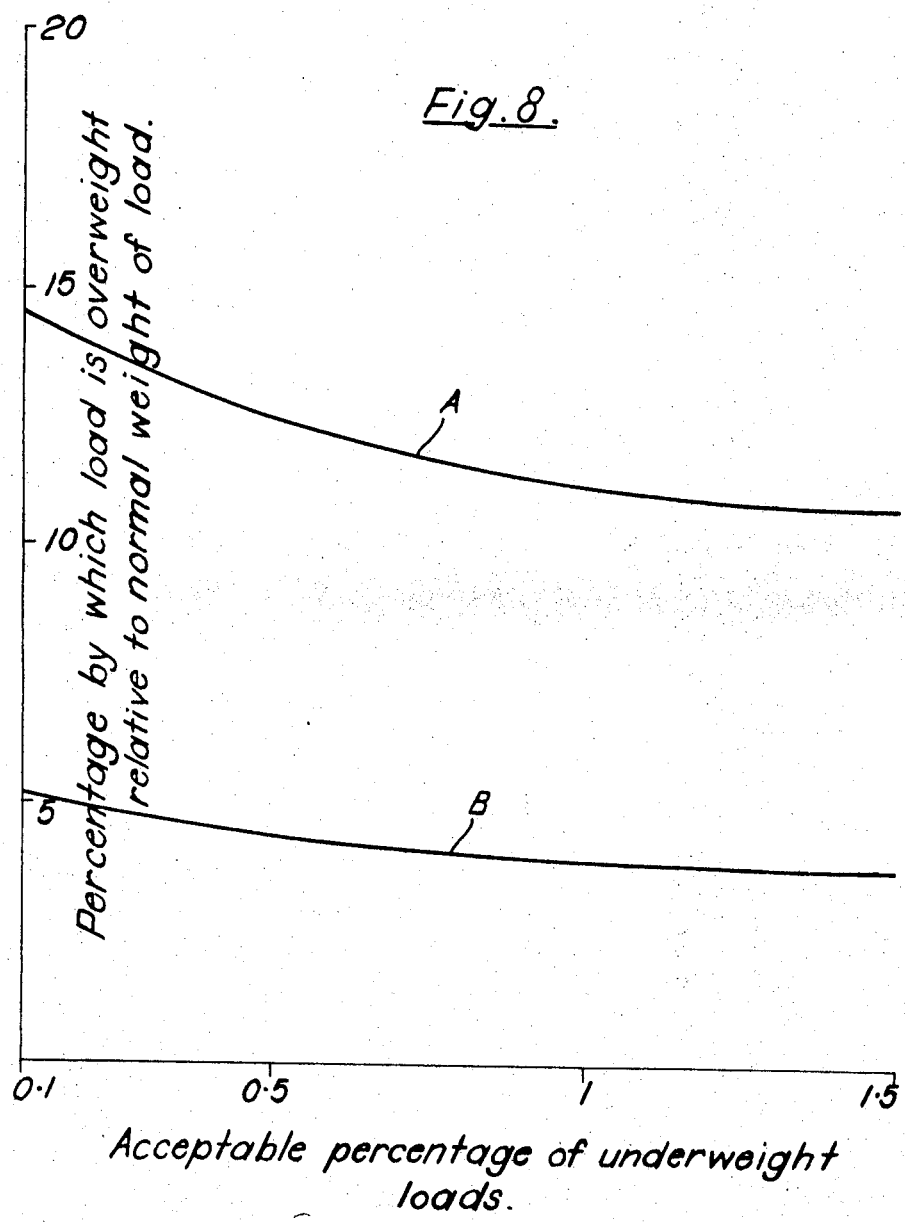

ELECTRICAL WEIGHING DEVICE FOR WEIGHING LOADS SUBJECT TO MOVEMENT

This invention relates to apparatus for weighing loads subject to movement and, more specifically, is concerned with apparatus for providing an electrical signal significant of the true weight of a load while experiencing vertical acceleration or tilting. The invention is particularly suitable for weighing loads in a craft or vehicle, such as a fishing vessel, where movement of the craft or vehicle produces inertial forces in the load resulting in violent fluctuations of the reading which prevent the true weight of the load from being determined with any degree of accuracy.

The inability of a conventional balance to measure loads with acceptable accuracy when subject to vertical acceleration is a particular nuisance in the fishing industry. A fishing vessel at sea may be required at any time to weigh a catch before freezing it into blocks each containing not less than a predetermined weight of fish. If the vessel is rolling or pitching, which is usually the case, the balance does not read accurately and it is therefore necessary for the operator using the balance to "overweigh" the fish by as much as 14 percent in order to ensure that the quantity of fish in each frozen block does not fall short of the requirements of the customer. Obviously the catch must be frozen as soon as possible after it is brought aboard and therefore the weighing of the catch into batches each containing not less than say 14 lbs. of fish cannot be delayed until the weather is suitable for accurate weighing.

An object of this invention is the provision of improved weighing apparatus.

Accordingly the invention provides apparatus for providing an electrical signal significant of the true weight of a load experiencing vertical accelerations or tilting while being weighed, comprising a carrier on which the load is placed during weighing, a load cell through which the apparent weight of the load is transmitted to a support, and which provides an electrical output an accelerometer mounted to be subject to the same vertical accelerations sensitive to tilting or tilting as the load, and electrical circuitry in which the accelerometer and the load cell are connected and from which said signal is obtained; the accelerometer being coupled to the output of the load cell to suppress the occurrence in the electrical signal of a component produced by vertical acceleration or tilting of the load being weighed.

The output circuit suitably includes a linear amplifier and preferably the accelerometer is connected in series with the amplifier to provide the signal significant of the true weight of the load.

Preferably the accelerometer is constructed as an electrical potentiometer. However in some circumstances an alternative form of accelerometer might be usable. For the fishing industry the accelerometer should be capable of experiencing accelerations of up to 1g. but practical considerations dictate that stops should be provided on the accelerometer to prevent it from responding to accelerations greater than 0.6g. The purpose of the stops is to prevent the accelerometer being burnt out when its impedance is a minimum and the load is relatively large. Under these conditions a current might possibly be drawn from the supply sufficient to damage the accelerometer.

The preferred arrangement of load cell comprises a bridge network of strain gauges. These may be arranged on a ring or some other form of load cell may be used. A scale pan is suitably suspended from the bottom end of the ring and the accelerometer is mounted such that its sensitive axis is on the line joining the support to the center of the scale pan.

The invention is also suitable for use in an array as in a weighbridge to indicate a total stabilized weight.

Embodiments of the invention will now be described, by way of example, with reference to the accompanying drawings, in which:

FIG. 8 is a graph showing the improvement in weighing obtained by using the invention.

Figure 1:
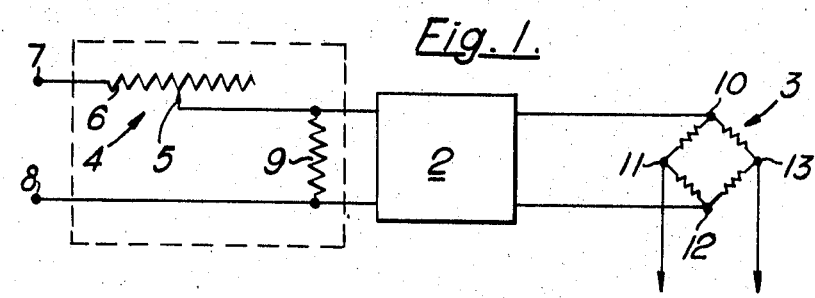
FIG. 1 is a block schematic circuit diagram of a first embodiment of electrical weighing device in which the input voltage to the load cell is compensated.

In a first example of the invention shown in FIG. 1 an electrical weighing device includes a voltage compensator 1, a linear amplifier 2, a strain gauge load cell 3 and an indicator (not shown). The voltage compensator 1 itself includes a linear potentiometric accelerometer 4 which is rigidly attached to the load cell 3 and to a suitable support and means are provided to suspend a load therebelow. Alternatively, the load may be placed above the rigid assembly. The indicator and the rest of the circuitry may be located adjacent to or remote from the assembly.

The voltage compensator 1 is adapted to have applied to it a constant input voltage which may be either alternating or unidirectional. It includes the linear potentiometric accelerometer 4 which is provided with a tapping 5 which, under conditions of zero acceleration, lies centrally of the potentiometer 6. The tapping 5 is, however, responsive to acceleration in either direction to move towards a respective end of the potentiometer. One end of the potentiometer is connected to a terminal 7 which is one of two terminals 7 and 8 to which the input voltage can be applied. The other end of the potentiometer is free and the tapping 5 is connected to the other terminal 8 via a fixed resistance 9 also forming part of the voltage compensator 1 and having an ohmic value which is small compared with that of the potentiometer 6.

Across the fixed resistance is connected a linear amplifier 2 to provide a boosted output voltage from the voltage compensator 1.

The amplifier 2 is connected across the input junctions 10 and 12 of a Wheatstone bridge strain gauge load cell 3 and the output junctions 11 and 13 of the cell 3 are connected to the indicator.

The voltage across the fixed resistance 9 may be expressed as:

$$Vr\frac{R}{2g}(g+a)+r \quad (1)$$

V is the constant input voltage applied to the voltage compensator;
R is the total resistance of the potentiometer;
r is the fixed resistance;
g is gravitational acceleration;
a is the acceleration due to movement; and which may be positive or negative relative to g.

The boosted output voltage from the amplifier 2 is therefore proportional to this expression (1) and is applied as the input voltage to the load cell 3. The output voltage from the load cell is also proportional to this expression and, furthermore, is proportional to the experienced or effective weight of the load which may be expressed as $$M(g+a) \quad (2)$$

where M is the mass of the load.

Therefore, the output voltage from the load cell 3 is proportional to the product of the expressions (1) and (2) which may be expressed as $$VrM(g+a)/\frac{R}{2g}(g+a)+r \quad (3)$$

Since $r$ is small compared with R the expression (3) is virtually equal to $$2VrMg/R \quad (4)$$

Since in the expression (4) R, $r$ and $g$ are constant, the output voltage from the load cell 3 is virtually proportional to M, the mass of the load, and is also proportional to V, the input voltage to the voltage compensator 1. Thus, the indicator can be calibrated simply to give accurate load readings.

In the apparatus described the voltage applied to the voltage compensator 1 at terminals 7 and 8 was 10 volts and the potentiometer 6 had a resistance of 2,000 ohms with a range equivalent to an acceleration between $\pm 1g$. However, mechanical stops (not shown in FIG. 1) were provided to give it an effective range of $\pm 0.6g$. This is a range much wider than would normally be required in practice for fishing vessels and also avoids the possibility of burning out the potentiometer 6. The fixed resistance 9 had a value of 1 ohm which is small compared with the smallest effective resistance which could be offered by the potentiometer 6, i.e. where $a = -0.6g$ and thus the effective resistance of the potentiometer 6 $R/2_g (g+a)$, equals 400 ohms. The amplifier 2 used gave a voltage amplification factor of 1,000 with a maximum output swing of $\pm 25$ volts.

Figure 2:
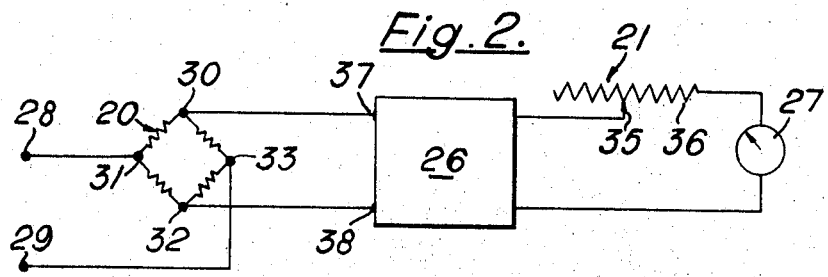
FIG. 2 is a block schematic circuit diagram of a second embodiment of electrical weighing device in which the output of the load cell is compensated.
Figure 3:
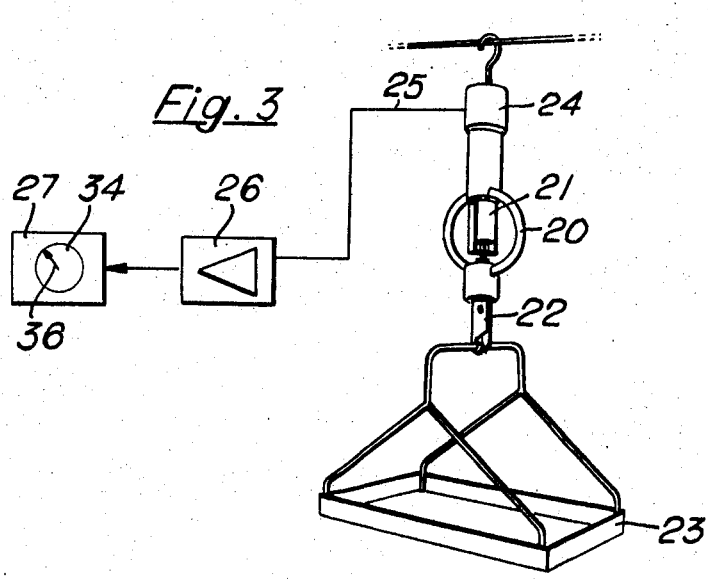
FIG. 3 illustrates suspended weighing apparatus incorporating the weighing device of FIG. 2.

In a second example of the invention shown in FIGS. 2 and 3 the apparatus is once again designed to be suspended from a deck-head hook on a ship (see FIG. 3) and comprises a strain gauge ring 20 in which is mounted an accelerometer 21. The lower end of the ring is provided with an attachment 22 for a scale pan 23 into which the fish to be weighed are to be placed. The strain gauge 20 and accelerometer are appropriately connected via a connection box 24 and cable group 25 to an amplifier 26 and ammeter 27.

Referring now to FIG. 2, a stabilized undirectional electrical supply voltage supplied at terminals 28 and 29 is applied to input terminals 31 and 33 of the strain gauge 20 which is unbalanced as a result of the weight of the scale pan 23. This unbalance may be compensated for by taring a dial 34 of the ammeter 27 on which the weight of the scale pan and fish is displayed.

The load cell formed by the strain gauge 20 has its output terminals 30 and 32 connected to the input terminals 37 and 38 of a linear amplifier 26. The amplifier has a gain of 500:1 and has a high input impedance and a low output impedance. The output of the amplifier is fed to the wiper 35 of a potentiometer accelerometer 21 capable of responding to accelerations in either direction of upwards 1g. One end of the resistance 36 of the accelerometer 21 is connected to ammeter 27 which is calibrated in terms of the true weight suspended from the load cell. This is the weight of the scale pan plus the weight of the fish. The dial 34 of the ammeter is provided with a pointer 36 which moves over a calibrated ring (not shown) which is angularly adjustable by means of a taring device (not shown) to enable the weight of the scale pan to be subtracted from the reading so that only the true weight of fish is read.

To use the apparatus it is suspended from the deck-head hook and the weight of the scale pan 23 is subtracted from the reading of the ammeter 27 by means of the taring device. The calibrated ring is naturally calibrated in terms of pounds of fish so that the ammeter 27 provides a direct reading of the weight of fish in the scale pan 23. The fish to be weighed may then be placed in the scale pan 23 and inertial forces acting on the strain gauge 20 are substantially prevented from appearing in the electrical output signal fed to the ammeter 27 as they are suppressed by the accelerometer 21. In consequence, although inevitably a small amount of fluctuation of the ammeter reading occurs, the error may be reduced to a few percent of the weight of the fish.

As an alternative to mechanical taring of the ammeter indicator, electrical taring may be used.

In the first apparatus described above the resistance of the potentiometer 6 is necessarily large, for example, 2,000 ohms, compared with the fixed resistance 9 which is small, suitably 1 ohm. In consequence the voltage across the resistance 9 for different accelerations experienced varies in a manner which corrects the error in the load cell output otherwise introduced and caused by the load cell 3 responding to the apparent load rather than the true load.

An advantage of the second embodiment described is that the voltage at the input terminals 37 and 38 of the linear amplifier 26 does not vary between as wide limits for a given acceleration, as is the case with the first apparatus. In consequence the amplifier 26 does not have a linear characteristic over as great a range of input voltages and a cheaper amplifier may therefore be used. The ammeter 27 in the second embodiment serves the same purpose as the resistance 9 in the first apparatus and its ohmic value is small compared with the resistance of the accelerometer 21.

Figure 4:
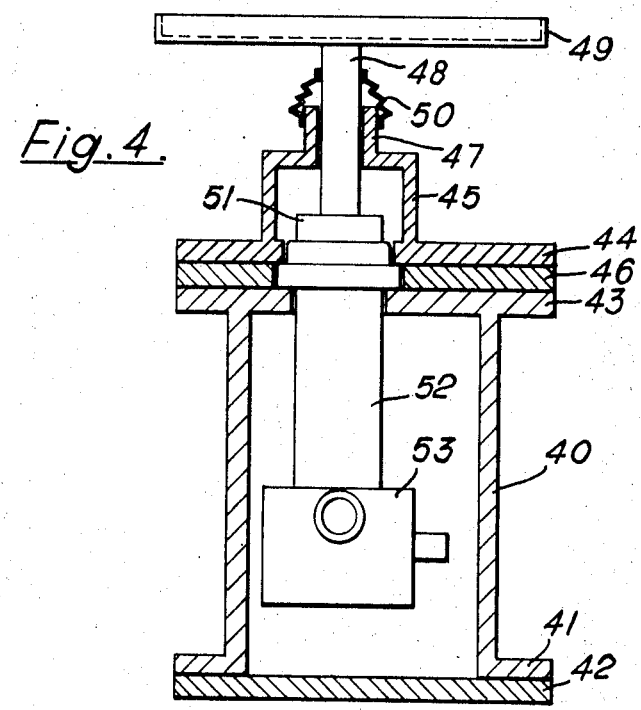
FIG. 4 illustrates the arrangement of the load cell and accelerometer of a device according to FIGS. 1 or 2 in a top loading weighing system.

FIG. 4 illustrates a practical arrangement of load cell and accelerometer for top loading weighing apparatus. A sturdy housing of the apparatus is formed by a rectangular container 40 having a lower flange 41 secured to a base plate 42 adapted to be rigidly fixed to, for example, the deck of a vessel. The container 40 also has a top flange 43 to which a corresponding flange 44 on a cap member 45 is secured with the interposition of a locating flange 46.

The member 45 has a neck 47 in which is received a shaft 48 carrying at its top a weighing platform 49. A rubber gaiter 50 serves to seal the entry of the shaft 48 into the neck 47 whilst allowing relative movement therebetween.

At the lower end of the shaft 48 there is a base 51 bearing on a load cell 52 located in the container 40 by the locating flange 46, so that weighing movement of the platform 49 and associated shaft 48 is transmitted to the load cell. An accelerometer 53 is rigidly attached to the load cell, so that it is subject to the same acceleration as the load cell 52 as a result of movement of the vessel during weighing.

Figure 5:
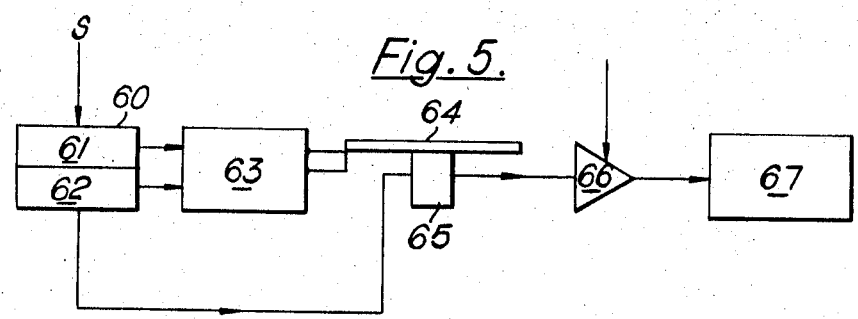
FIG. 5 is a block schematic circuit diagram of a third embodiment of electrical weighing device in which the output of the load cell is compensated.
Figure 6:
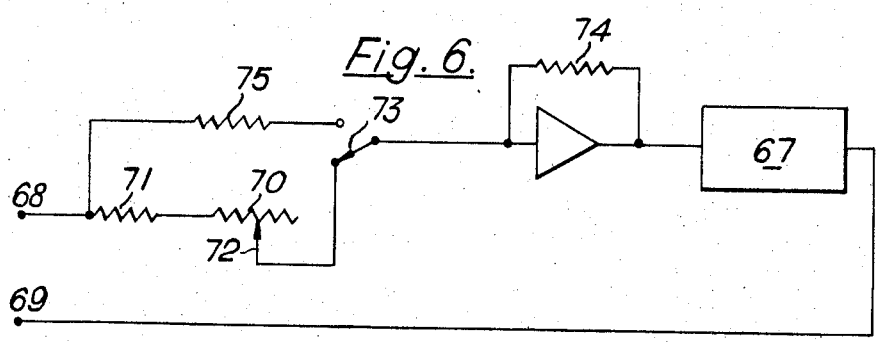
FIG. 6 is a circuit diagram showing the accelerometer used in the device of FIG. 5 in more detail.

FIGS. 5 and 6 illustrate a third example of weighing machine embodying the invention, in which a load cell is employed to modulate an alternating current at a carrier frequency in dependence upon the effective load to which the load cell is subjected. The output from the load cell is fed to a demodulator and the demodulated signal is then fed to a compensator circuit where the demodulated signal is corrected to provide an output signal proportional to the true weight of the load.

Referring firstly to FIG. 5, the weighing device can be seen schematically to comprise a unit 60 comprising an oscillator 61 and a demodulator 62. The oscillator 61 is fed from a power supply 5 and generates an alternating current at a carrier frequency which is applied to a load cell 63 sensing the movement of a weighing platform 64 on which the load is placed. The load cell comprises a parallelogram of springs and is constituted as a differential transformer displacement transducer having as its input the carrier signal from the oscillator 61. The output from the load cell is fed to the demodulator 62 which operates to produce a demodulated direct current which is proportional to the effective weight of the load. The output from the demodulator is fed to an accelerometer 65 rigidly attached to the weighing platform. The accelerometer is connected to deliver a compensated output to an operational amplifier 66 which, therefore, feeds a current which is proportional to the true weight of the load to a calibrated readout device 67, i.e. a voltmeter.

FIG. 6 shows the compensator circuit in more detail. The direct current output from the demodulator 62 is applied at the two terminals 68 and 69. The terminal 68 is connected to one end of the potentiometer 70 of the accelerometer 65 via a padding resistor 71 the significance of which will be described hereinafter. A wiper 72 which takes up a position along the potentiometer 70 corresponding to the acceleration which the weighing device is undergoing is adapted to be connected to the operational amplifier 66 in one position of a two way switch 73. In the other position of the switch 73 the amplifier 66 is connected directly to terminal 68 through a fixed current-limiting resistor 75 of, for example, 46 kilohms. Thus, in the one position of the switch 73 the amplifier 66 receives a compensated output signal corrected for acceleration of the vehicle on which the weighing device is situated, while in the other position of switch 73 the amplifier receives an uncompensated output for checking purposes. The amplifier 66 is provided with a feedback resistor 74 in conventional manner.

The padding resistor 71 is dimensioned to make the potentiometer resistance up to the required value of 1g. for its lefthand half. The provision of the padding resistor 71, therefore, enables the end of the potentiometer track to be short circuited and while this results in the dynamic range being slightly reduced it enables the wiper of the potentiometer to be placed artificially at the exact center of the track and simplifies the manufacture of the accelerometer.

Figure 7:
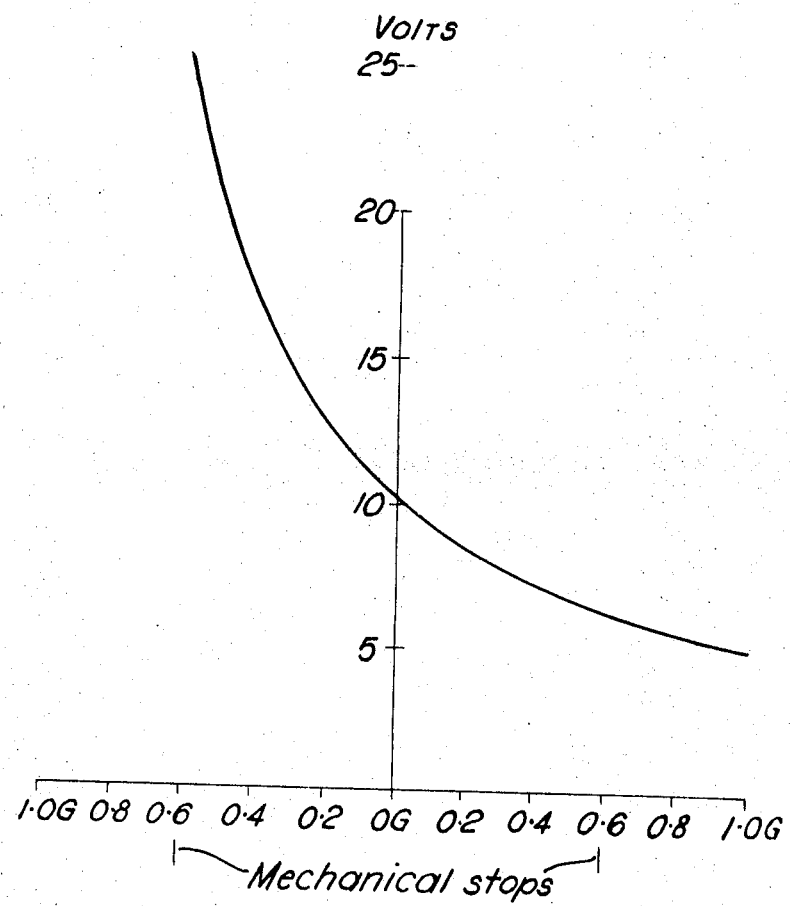
FIG. 7 is a graph showing the change in load cell supply voltage which must be produced by the accelerometer in the arrangement of FIG. 1 to compensate for inertial forces.

FIG. 7 is a graph showing the change in load cell supply volts which must be produced by the accelerometer in the arrangement of FIG. 1 to compensate for inertial forces. The ordinate of the graph representing the supply volts is marked off in volts and the abscissa representing a range of possible accelerations is marked off in tenths of the acceleration due to gravity (g.). The nominal load cell supply voltage is 10 volts where the graph crosses the ordinate axis and it will be seen that the required supply voltage increases for negative accelerations, that is accelerations in opposition the acceleration due to gravity, and decreases for positive acceleration.

FIG. 8 gives a comparison of an uncompensated weighing apparatus with a compensated weighing device according to the invention. The comparison is based on a plot of the means value of overweight of a load (as a percentage of the nominal weight of the load) against the acceptable percentage of underweight articles. The upper curve A is a plot for weighing apparatus which is uncompensated for acceleration of the vessel and the lower curve B is for a weighing device embodying the invention. It will be seen that for curve B the percentage by which a load is overweight is of the order of 10 percent lower than the corresponding percentage for curve A when the acceptable percentage of underweight articles is 0.1 percent.

An advantage of the embodiments of the invention described hereinbefore is that provided the accelerometer and load cell are rigidly mechanically connected, the effects of tilting on the load cell output are compensated for by the accelerometer as well as the effects of acceleration. If the load cell tilts, the output diminishes but the suppression effect introduced by the accelerator is reduced also by the cosine of the angle of tilt from the vertical. In consequence the load cell and accelerometer need not be suspended but may be rigidly connected to the same structure.

I claim:

1. Apparatus for providing an electrical signal significant of the true weight of a load experiencing vertical accelerations while being weighed, comprising a carrier on which the load is placed during weighing, wherein the improvement comprises a load cell through which the apparent weight of the load is transmitted to a support, an accelerometer mounted to be subject to the same vertical accelerations as the load, and electrical circuitry in which the accelerometer and the load cell are connected and from which said signal is obtained, the accelerometer varying the voltage applied to the load cell and being connected to suppress the occurrence in the electrical signal of an inertial component produced by vertical acceleration of the load being weighed, said electrical circuitry including a linear amplifier having input terminals connected to receive the electrical output of the accelerometer and output terminals connected to apply the amplified electrical output of the accelerometer to input terminals of the load cell whereby the electrical output of the load cell constitutes said signal.

2. Apparatus for providing an electrical signal significant of the true weight of a load experiencing vertical accelerations while being weighed, comprising a carrier on which the load is placed during weighing, wherein the improvement comprises a load cell through which the apparent weight of the load is transmitted to a support, an accelerometer mounted to be subject to the same vertical accelerations as the load, and electrical circuitry in which the accelerometer and the load cell are connected and from which said signal is obtained, the accelerometer being connected to suppress the occurrence in the electrical signal of an inertial component produced by vertical acceleration of the load being weighed, said load cell providing an electrical output which is significant of the apparent weight of the load and which is fed through the accelerometer to provide said signal.

3. Apparatus as claimed in claim 2, in which the electrical circuitry includes a linear amplifier having input terminals connected to receive the electrical output of the load cell.

4. Apparatus as claimed in claim 2, in which the load cell is used to modulate a carrier signal in accordance with the apparent weight of the load.

5. Apparatus as claimed in claim 4, in which an alternating current from an oscillator is fed to the load cell which is constituted as a differential transformer producing a modulated electrical output significant of the apparent weight of the load, the modulated electrical output is fed to a demodulator and the accelerometer is connected to receive the electrical output of the demodulator and to provide said signal significant of the true weight of the load.

6. Apparatus as claimed in claim 5, in which said signal significant of the true weight of the load is fed to a readout device through an operational amplifier.

7. Apparatus for providing an electrical signal significant of the true weight of a load experiencing vertical accelerations or tilting while being weighed, comprising a carrier on which the load is placed during weighing, a load cell through which the apparent weight of the load is transmitted to a support and which provides an electrical output, an accelerometer sensitive to tilting mounted to be subject to the same vertical accelerations or tilting as the load, and electrical circuitry in which the accelerometer and the load cell are connected and from which said signal is obtained, the accelerometer being coupled to the output of the load cell to suppress the occurrence in the electrical signal of a component produced by vertical acceleration or tilting of the load being weighed.

8. Apparatus as defined in claim 7 in which the electrical circuitry includes a linear amplifier having input terminals connected to receive the electrical output of the load cell.

9. Apparatus as defined in claim 7 in which the load cell is used to modulate a carrier signal in accordance with the apparent weight of the load.

10. Apparatus as defined in claim 9 in which an alternating current from an oscillator is fed to the load cell which is constituted as a differential transformer producing a modulated electrical output significant of the apparent weight of the load, the modulated electrical output being fed to a demodulator and the accelerometer being connected to receive the electrical output of the demodulator and to provide said signal significant of the true weight of the load.

11. Apparatus as defined in claim 10 in which said signal significant of the true weight of the load is fed to a readout device through an operational amplifier.

12. Apparatus for providing an electrical signal significant of the true weight of a load experiencing vertical accelerations while being weighed, comprising a carrier on which the load is placed during weighing, a load cell through which the apparent weight of the load is transmitted to a support and which provides an electrical output which is significant of the apparent weight of the load, and an accelerometer mounted to be subject to the same vertical accelerations as the load and coupled to receive the output of the load cell to suppress the occurrence in the output of a component produced by vertical acceleration of the load being weighed to provide said true weight signal.